(12) United States Patent
Youngberg et al.

(10) Patent No.: US 10,387,659 B1
(45) Date of Patent: Aug. 20, 2019

(54) METHODS AND SYSTEMS FOR DE-DUPLICATION OF FINDINGS

(71) Applicant: Capital One Services, LLC, McLean, VA (US)

(72) Inventors: Adam Youngberg, Allen, TX (US); Stephen Kent, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/177,299

(22) Filed: Oct. 31, 2018

(51) Int. Cl.
*H04L 12/26* (2006.01)
*G06F 21/00* (2013.01)
*G06F 21/57* (2013.01)
*G06F 21/55* (2013.01)
*G06F 21/56* (2013.01)
*G06F 16/174* (2019.01)

(52) U.S. Cl.
CPC ........ *G06F 21/577* (2013.01); *G06F 16/1748* (2019.01); *G06F 21/552* (2013.01); *G06F 21/562* (2013.01); *G06F 21/566* (2013.01)

(58) Field of Classification Search
None
See application file for complete search history.

(56) References Cited

U.S. PATENT DOCUMENTS

| | | | |
|---|---|---|---|
| 9,418,230 B2 | 8/2016 | Archer et al. | |
| 2014/0082739 A1* | 3/2014 | Chess | G06F 21/577 726/25 |
| 2015/0379273 A1* | 12/2015 | Chess | G06F 21/577 726/25 |
| 2017/0270303 A1* | 9/2017 | Roichnnan | G06F 11/3668 |
| 2018/0365284 A1* | 12/2018 | Hirsch | H03M 7/3091 |

FOREIGN PATENT DOCUMENTS

WO     2016018289 A1    2/2016

* cited by examiner

*Primary Examiner* — Alexander Lagor
(74) *Attorney, Agent, or Firm* — Troutman Sanders LLP; Christopher J. Forstner; John A. Morrissett

(57) ABSTRACT

A system for performing de-duplication of findings includes a non-transitory computer readable medium and a processor. The non-transitory computer readable medium stores normalized findings of application code performed by at least one software security analysis tool. Each normalized finding is identifiable by a fingerprint. The processor receives a first finding in a first vendor-provided format from a first software security analysis tool that performs a scan of application code. The processor receives a second finding in a second vendor-provided format from a second software security analysis tool. The processor normalizes the findings to a standardized taxonomy. The processor determines a first fingerprint and a second fingerprint that respectively identify the normalized first and second findings. The processor determines any need to update the normalized first finding by comparing the normalized second finding with the normalized first finding after determining that the second fingerprint at least partially matches the first fingerprint.

18 Claims, 9 Drawing Sheets

API REFERENCE
Application
Beta
Component
Deprecated
Devops
Static Assessment
Enroll
Reports

API
Bake security into your build process.
Return to Home
Contact:
Email address
BASE URL: /api/ API VERSION: 1.0

Static Assessment

POST /assessment/static

This endpoint receives output from a build process (e.g. Jenkins automation server). Required inputs include a dependency-resolved code archive and the name of the registered component to assess. A successful POST will initiate both static and composition code scans by default.

take over 5 minutes to complete

Parameters componentNa... (required)
[string] Component name as registered in the application codeArchive [ Browse... | No file selected ]
[file]
Zipped archive of code with resolved dependencies - file should be in .zip format staticOnly [ ▼ ]
[boolean]
To run only a static scan, optionally set this parameter to `true`. Note: If specified, either `staticOnly` OR `compositionOnly` must be true.

compositionO... [ ▼ ]
[boolean]
To run only a composition scan, optionally set this parameter to `true`. Note: If specified, either `staticOnly` OR `compositionOnly` must be true.

Test this endpoint
[ TRY ]

RESPONSE SAMPLE
{
 "code": 200,
 "message": "success"
}

RESPONSE SCHEMA

[ ] Success code
[integer]
request status.

message
[string] troubleshoot and resubmit.

fields
[string] (optional) correspond to one another

FIG. 9

METHODS AND SYSTEMS FOR DE-DUPLICATION OF FINDINGS

CROSS-REFERENCE OF RELATED APPLICATIONS

This disclosure incorporates by reference U.S. patent application Ser. No. 16/177,178, filed Oct. 31, 2018, entitled "Methods and Systems for Multi-tool Orchestration", U.S. patent application Ser. No. 16/177,236, filed Oct. 31, 2018, entitled "Methods and Systems for Reducing False Positive Findings," U.S. patent application Ser. No. 16/177,275, filed Oct. 31, 2018, entitled "Methods and Systems for Determining Software Risk Scores," the contents of which are incorporated by reference herein as if they were restated in full.

FIELD

The presently disclosed subject matter relates generally to de-duplication of software security analysis findings generated by multiple software security analysis tools.

BACKGROUND

Some existing tools provide a mechanism to retrieve findings from software security testing tools. When they attempt to combine findings into a single view, the existing tools tend to either simply aggregate data without de-duplication or ineffectually de-duplicate findings. The existing tools are intolerant to small changes or differences of findings generated by different software security testing tools or scan-over-scan findings generated by the same software security testing tool, result in ineffectual de-duplication. When the existing tools combine findings, partial matches among findings are particularly problematic and often result in incorrect or incomplete combination of findings.

Further, when static code analysis is done to find security vulnerabilities using multiple static application security testing (SAST) tools from different vendors, results each come back in a format specific to the vendor, creating more hardship to perform de-duplication of findings.

In view of the foregoing, a need exists for a de-duplication solution that is able to consume findings of multiple static application security testing tools in a single, de-duplicated format, normalized to a standardized taxonomy, so that developers and security personnel can focus on individual problems in a simpler-to-consume format.

SUMMARY

Aspects of the disclosed technology include systems and methods for performing de-duplication of software security analysis findings generated by multiple software security analysis tools. The findings reveal software issues, such as security vulnerabilities, detected by the software security analysis tools. The software security analysis tools may be provided by different vendors. Each software security analysis tool may provide its findings in a vendor-provided format. The vendor-provided formats from different software security analysis tools may be different from each other. The software security analysis tools may be different tools chosen from categories such as SAST tools and Dynamic Application Security Testing (DAST) tools. In one example, the software security analysis tools may be of the same category, such as all of them are SAST tools, or all of them are DAST tools. In another example, the software security analysis tools may be of different categories, such as at least one of them is an SAST tool, and at least another one of them is a DAST tool.

The disclosed system normalizes each finding to a standardized taxonomy and determines a fingerprint that identifies the finding. To determine duplication of findings, the disclosed system compares fingerprints to determine if there is any partial match or full match. If a new fingerprint for a new finding at least partially matches an existing fingerprint for an existing finding already stored in the system, the system may determine if the new finding contains any update relative to the existing finding. The system may store any update relative to the existing finding. As a result, the system may trace historical developments of software issues revealed by the findings. Information of the findings can be displayed to a user via a graphical user in interface. Through the graphical user interface, the user can view historical developments of software issues as detected by software security analysis tools.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 7 is an example screenshot of a graphical user interface of the deduplication system according to one aspect of the disclosed technology.

FIG. 9 is an additional example screenshot of the graphical user interface of the deduplication system according to one aspect of the disclosed technology.

DETAILED DESCRIPTION

Figure 1:
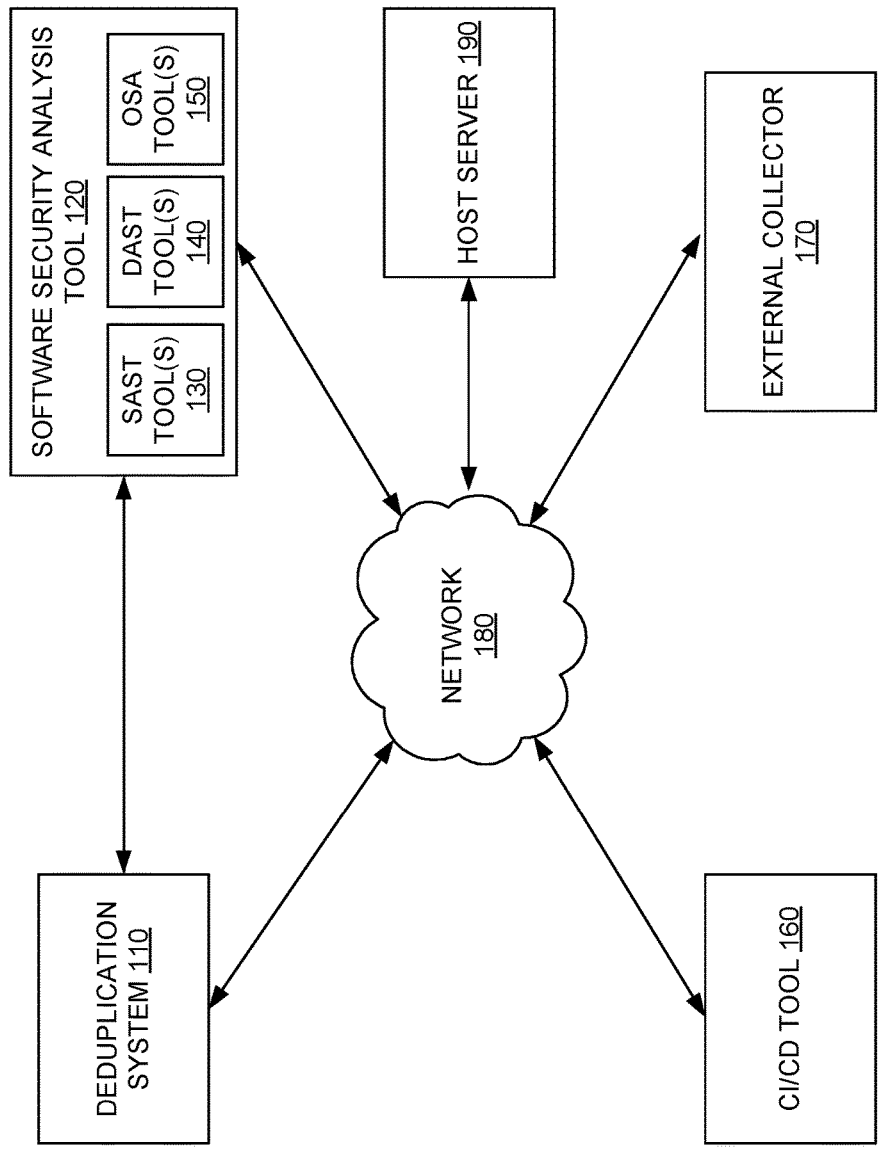
FIG. 1 is a diagram of an example environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Consistent with the disclosed embodiments, a system for performing de-duplication of findings includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor receives a first finding in a first vendor-provided format from a first software security analysis tool that performs a scan of application code. The processor normalizes the first finding to a standardized taxonomy. The processor determines a first fingerprint that identifies the normalized first finding. The non-transitory computer readable medium stores the normalized first finding identifiable by the first fingerprint and associated with a first timestamp. The processor receives a second finding in a second vendor-provided format from a second software security analysis tool that performs a scan of the application code. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines any need to update the normalized first finding by comparing the normalized second finding with the normalized first finding after determining that the second fingerprint at least partially matches the first fingerprint.

In one embodiment, the first software security analysis tool and the second software security analysis tool belong to at least one of the following categories: a first category for performing SAST, and a second category for performing DAST.

In one embodiment, the first software security analysis tool and the second software security analysis tool belong to the same category.

In one embodiment, the first software security analysis tool and the second software security analysis tool belong to different categories.

In one embodiment, each fingerprint includes at least one of the following: name, category, and severity of a finding.

In one embodiment, the code detail includes line number and code content.

In one embodiment, the first software security analysis tool and the second software security analysis tool are from different vendors.

In one embodiment, the first software security analysis tool is identical to the second software security analysis tool.

In one embodiment, the first software security analysis tool is different from the second software security analysis tool.

In one embodiment, the first vendor-provided format is identical to the second vendor-provided format.

In one embodiment, the first vendor-provided format is different from the second vendor-provided format.

In one embodiment, the processor may determine that the second fingerprint at least partially matches the first fingerprint. After the processor determines that the normalized second finding differs from the normalized first finding, the processor stores an update to the normalized first finding in the non-transitory computer readable medium. The update to the normalized first finding is associated with the second timestamp. The graphical user interface may be configured to display the normalized first finding and the first timestamp. The graphical user interface may also be configured to display the update to the normalized first finding and the second timestamp.

In one embodiment, the processor determines that the second fingerprint fails to at least partially match each fingerprint stored in the non-transitory computer readable medium. The processor adds the normalized second finding for storage in the non-transitory computer readable medium. The normalized second finding is identifiable by the second fingerprint.

In one embodiment, each software security analysis tool is a standalone solution, a network-based client-server solution, a web-based solution, or a cloud-based solution.

In one embodiment, the non-transitory computer readable medium stores information of historical updates of each normalized finding for display in the graphical user interface upon request.

Another aspect of the disclosed technology relates to a system for performing de-duplication of findings, where the system includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor is configured to receive a first finding in a first vendor-provided format from a first SAST tool that performs a scan of application code. The processor normalizes the first finding to a standardized taxonomy. The processor determines a first fingerprint that identifies the normalized first finding. The non-transitory computer readable medium stores the normalized first finding. The normalized first finding is identifiable by the first fingerprint and associated with a first timestamp. The processor receives a second finding in a second vendor-provided format from a second SAST tool that performs a scan of application code. The second SAST tool is different from the first SAST tool. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines that the second fingerprint at least partially matches the first fingerprint. The processor determines that the normalized second finding differs from the normalized first finding. Thereafter, the non-transitory computer readable medium stores an update to the normalized first finding based on the normalized second finding. The update to the normalized first finding is associated with a second timestamp. The graphical user interface is configured to display the normalized first finding and the first timestamp. The graphical user interface is also configured to display the update to the normalized first finding and the second timestamp.

In one embodiment, each fingerprint includes at least one of the following: name, category, and severity of a finding.

In one embodiment, the first vendor-provided format is different from the second vendor-provided format.

A further aspect of the disclosed technology relates to a system for performing de-duplication of findings. The system includes a non-transitory computer readable medium, a graphical user interface and a processor. The non-transitory computer readable medium stores normalized software security analysis findings of application code performed by at least one software security analysis tool. Each normalized finding is identifiable by a fingerprint. The graphical user interface is configured to display information related to each normalized finding. The processor is configured to receive a first finding in a first vendor-provided format from a SAST tool that performs a scan of application code. The processor normalizes the first finding to a standardized taxonomy. The processor determines a first fingerprint that identifies the normalized first finding. The non-transitory computer readable medium stores the normalized first finding. The normalized first finding is identifiable by the first fingerprint and associated with a first timestamp. The processor receives a second finding in a second vendor-provided format from a DAST tool that performs a scan of the application code. The processor normalizes the second finding to the standardized taxonomy. The processor determines a second fingerprint that identifies the normalized second finding. The processor determines whether the second fingerprint at least partially matches each fingerprint stored in the non-transitory computer readable medium. The processor determines that the second fingerprint at least partially matches the first fingerprint. The processor determines that the normalized second finding differs from the normalized first finding. An update to the normalized first finding based on the normalized second finding is sent to the non-transitory computer readable medium for storage. The update to the normalized first finding is associated with a second timestamp. The graphical user interface is configured to display the normalized first finding and the first timestamp. The graphical user interface is also configured to display the update to the normalized first finding and the second timestamp.

In one embodiment, each fingerprint includes at least one of the following: name, category, and severity of a finding. Consistent with the disclosed embodiments, methods for performing de-duplication on findings generated by multiple software security analysis tools are disclosed.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: one or more deduplication systems 110, one or more software security analysis tools 120, one or more continuous integration, continuous delivery (CI/CD) tools 160, one or more external collectors 170, one or more networks 180, and one or more host servers 190.

The software security analysis tools 120 may include one or more categories, such as a first category of one or more SAST tools 130, a second category of one or more DAST tools 140, and a third category of one or more open source analysis (OSA) tools 150, among other possibilities.

Each software security analysis tool 120 of the first, second and third categories may be a standalone solution, a network-based client-server solution, a web-based solution, or a cloud-based solution, among other possibilities. Each software security analysis tool 120 may be provided by a different licensor or vendor, and thus each may be independent of each other. The SAST tools 130 may include Checkmarx™ and Fortify™, among other possibilities. The DAST tools 140 may include WebInspect™ and Contrast™, among other possibilities. The OSA tools 150 may include Whitesource™ and Blackduck™, among other possibilities.

The deduplication system 110 may perform de-duplication of the findings provided by different tools 120. For instance, if findings returned by same or different tools 120 reveal the same software issue in the same software project or same application code, then the deduplication system 110 may eliminate duplicate findings. If findings returned by same or different tools 120 represent developments or updates overtime on the same software issue in the same software project or same application code, the deduplication system 110 may track historical updates on the same software issue and make such information readily available to a user upon request.

Figure 2:
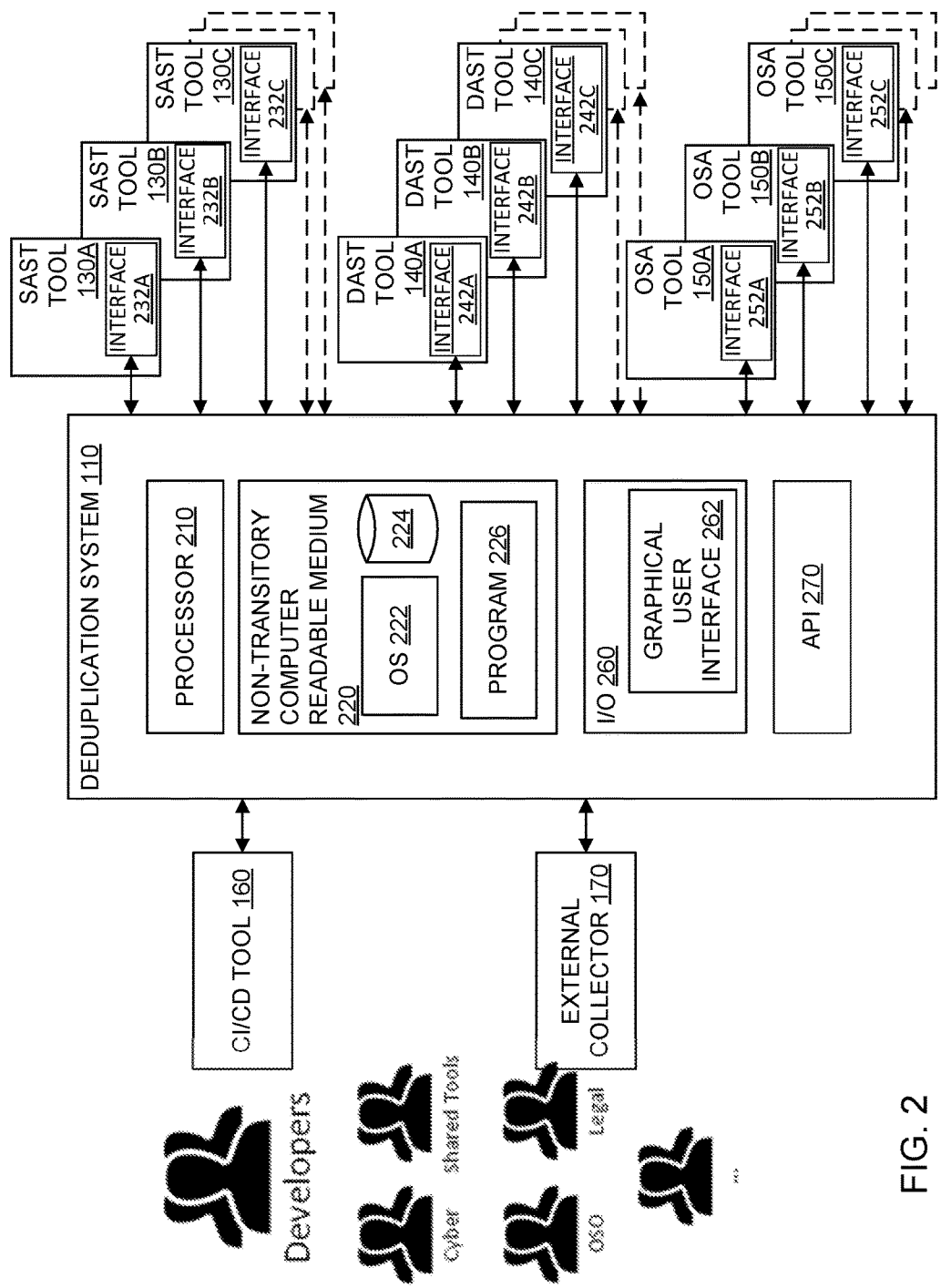
FIG. 2 is an example block diagram illustrating communications between a deduplication system and multiple software security analysis tools according to one aspect of the disclosed technology.

Turning to FIG. 2, various users or interest groups, such as developers, lines of business, and executive stakeholders may use the deduplication system 110 to deduplicate findings generated by one or more SAST tools 130A-130C, one or more DAST tools 140A-140C, one or more OSA tools 150A-150C, among other possibilities.

Each software security analysis tool 120 may have a vendor-established taxonomy. Findings reported by each software security analysis tool 120 may be in a vendor-provided format. The vendor-provided format may be XML, JSON, or other structured format.

In some example embodiments, the deduplication system 110 may not rely on or expressly adopt any given taxonomy. For example, deduplication system 110 may not rely on common weakness enumeration (CWE) or vendor-established taxonomies. Instead, an example deduplication system 110 may have a unique internal standardized taxonomy that reconciles findings generated by different software security analysis tools 120. The standardized taxonomy may be managed or defined by a dynamic classification system of names and categories. As a result, regardless of their vendor-provided formats, the deduplication system 110 may normalize each finding to a standardized taxonomy, for instance, by performing mappings to corresponding names and categories in the classification system. The classification system may be dynamically maintained such that any new name or category revealed by any new finding may be dynamically added to the classification system.

The deduplication system 110 may use a fingerprint approach to determine correlation or similarity among findings generated by different software security analysis tools 120. The fingerprint approach may be associated with line position, contents, CWE and other identifying factors, to determine whether two findings produced by two different software security analysis tools 120 are the same. The fingerprint approach remains robust regardless whether the code position, line or content changes in subsequent scans.

For example, for each normalized finding, the deduplication system 110 may determine a fingerprint that identifies the normalized finding. The deduplication system 110 may collect or organize one or more of the following meta information or metadata surrounding each finding to form its fingerprint: associated CWE information, framework alignment, code details, and any identifying factor, among other possibilities. Framework alignment may include Web Application Security Consortium (WASC), and Open Web Application Security Project (OWASP) Top 10, among other possibilities. Code details may include line numbers and contents, among other possibilities.

The deduplication system 110 may use the fingerprint to determine whether a finding is unique. For this purpose, the deduplication system 110 may implement a machine learning algorithm that identifies partial or full matches of fingerprints. For instance, the deduplication system 110 may use a threshold of similarity to determine partial matches of fingerprints. For instance, two fingerprints may partially match each other when the only difference between them is their line numbers, while remaining portions of the fingerprints are identical. While training the algorithm, the algorithm may be set with weights and percentages to determine a match. The weights and percentages may vary for different types or categories of tools 120 and may also change over time. For example, partial match on fingerprints of findings generated by SAST tools 130 may likely be much more limited than partial match on fingerprints of findings generated by DAST tools 140, because SAST tools 130 tend to consistently return the same findings run over run, whereas DAST tools 140 are less consistent and may allow for more leeway.

The algorithm may tolerate differences in code line numbers or code contents. The algorithm may de-duplicate findings generated by different software security analysis tools 120. The algorithm may also de-duplicate findings generated by the same software security analysis tools 120, scan over scan, as attributes change.

To determine whether two findings are identical or relevant to each other, the deduplication system 110 may compare their respective fingerprints. If two fingerprints at least partially match each other, their respective findings may be identical or related to each other. If two findings are identical, the deduplication system 110 may eliminate one finding to avoid duplication of findings. If two findings are related to each other, they may represent historical developments of the same software issue, such that one finding represents an update relative to the other finding. Updates may include a line number change, or line content change, among other possibilities. The deduplication system 110 may track such historical developments or updates of same software issues.

The deduplication system 110 may include one or more of the following: a processor 210, a non-transitory computer readable medium 220, an input/output ("I/O") device 260, and an application program interface (API) 270, among other possibilities. The I/O device 260 may include a graphical user interface 262.

The non-transitory computer readable medium 220 may store normalized findings. Each normalized finding may be identifiable by a fingerprint. The non-transitory computer readable medium 220 may store information of historical updates of each normalized finding for display in the graphical user interface 262 upon request.

Different software security analysis tools 120 may yield a different set of findings. Some findings may duplicate each other, whereas other findings may be unique. The deduplication system 110 may de-duplicate and aggregate findings provided by software security analysis tools 120 into a meaningful singular result, regardless of whether the software security analysis tools 120 are of the same or different categories. For example, the deduplication system 110 may receive findings from SAST tools 130A-B and DAST tools 140A-B, and de-duplicate the findings.

The deduplication system 110 may trace historical scan activities. As the deduplication system 110 receives findings from each software security analysis tool 120, the deduplication system 110 may continuously perform de-duplication and aggregation of findings as each scan is completed.

Figure 3:
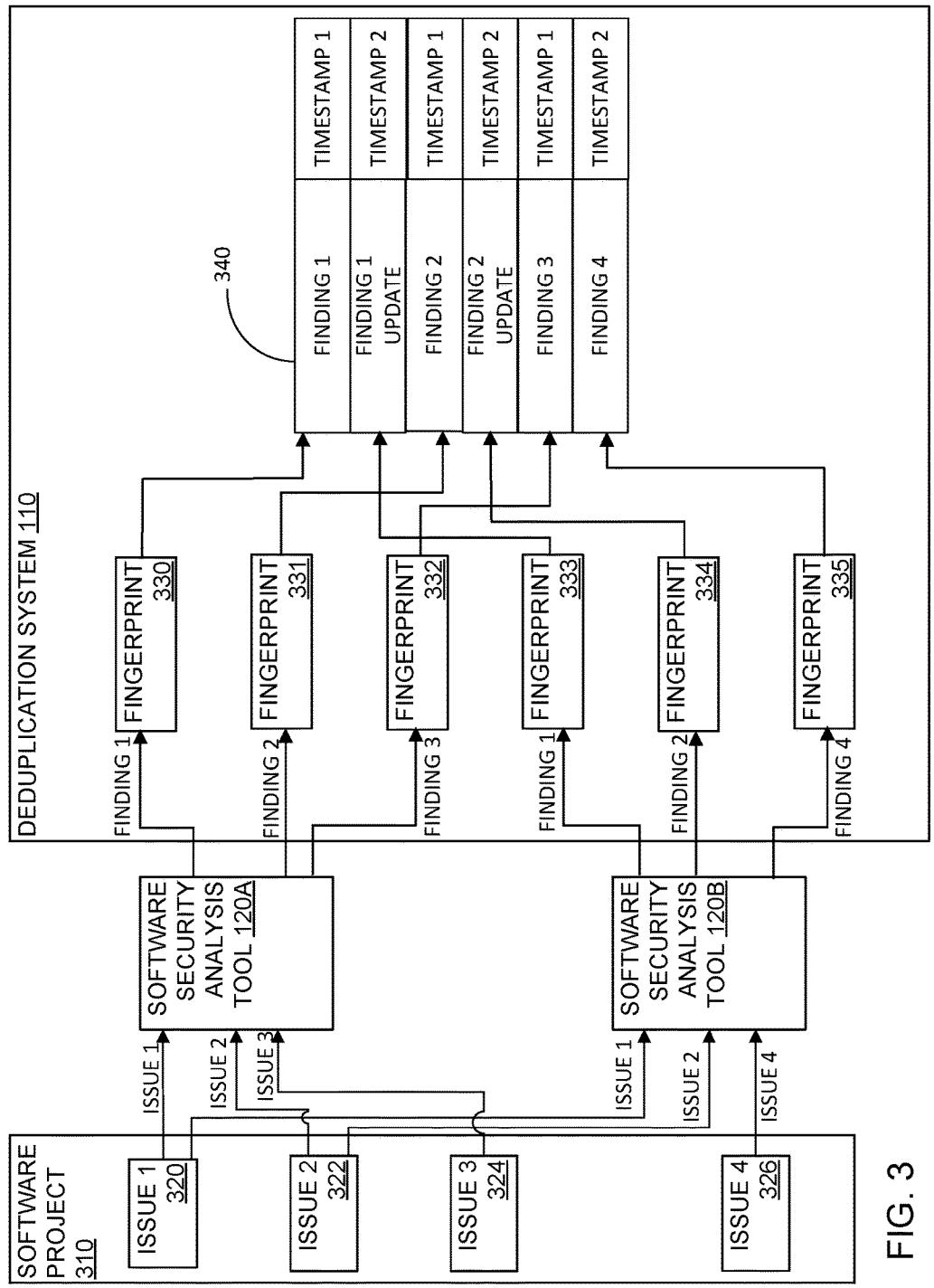
FIG. 3 is an example block diagram illustrating a duduplication process of findings performed by the deduplication system according to one aspect of the disclosed technology.

FIG. 3 illustrates a block diagram illustrating a deduplication process performed by the deduplication system 110. The deduplication system 110 may receive findings generated by multiple software security analysis tools 120A and 120B that perform scans of application code of a software project 310. The software project 310 may include a plurality of application code.

The first software security analysis tool 120A and the second software security analysis tool 120B may belong to at least one of the following categories: a first category for performing SAST, and a second category for performing DAST.

In one embodiment, the tools 120A and 120B may belong to the same category. For instance, both tools may be SAST tools, or both tools may be DAST tools.

In one embodiment, the tools 120A and 120B may represent subsequent runs of the same tool. For instance, both tools 120A and 120B may be Checkmarx™, but run at different times. The deduplication system 110 may track developments or updates of findings between subsequent runs of the same tool.

The deduplication system 110 may also receive findings between subsequent runs of different tools. In one embodiment, although the tools 120A and 120B may belong to the same category, they are in fact different from each other. For instance, while both tools may be SAST tools, the tool 120A may be Checkmarx™, and the tool 120B may be Fortify™. In another embodiment, each tool may be from a different category. For instance, one of the tools 120A and 120B may be a SAST tool, while the other may be a DAST tool.

In one embodiment, the tools 120A and 120B may be from different vendors.

Each tool 120A, 120B may generate a finding at a vendor-provided format. For instance, the first tool 120A may generate findings in a first vendor-provided format, and the second tool 120B may generate findings in a second vendor-provided format. The first and second vendor-provided formats may be identical to or different from each other. In one example, findings generated by the first tool 120A may be in the format of XML, while findings generated by the second tool 120B may be in the format of JSON.

Application code of the software project 310 may include several software issues that are detectable by one or more software security analysis tools. For instance, software issues 1, 2 and 3 may be detectable by the first tool 120A, while software issues 1, 2, and 4 may be detectable by the second tool 120B. Each tool may generate a finding corresponding to each detectable software issue. For example, the first tool 120A may generate findings identifying issues 1, 2 and 3. The second tool 120B may generate findings identifying issues 1, 2 and 4. The tools 120A and 120B may report their findings to the deduplication system 110.

The tools 120A and 120B may report their findings at different timestamps. For instance, the first tool 120A may report at a first timestamp, and the second tool 120B may report at a second timestamp. The second timestamp may occur after the first timestamp.

For each finding, the deduplication system 110 may normalize the finding to the standardized taxonomy. For instance, the deduplication system 110 may normalize findings generated by the first tool 120A in the format of XML to the standardized taxonomy. The deduplication system 110 may normalize findings generated by the second tool 120B in the format of JSON to the standardized taxonomy.

The deduplication system 110 may determine a fingerprint 330-335 that represents each normalized finding. Each fingerprint 330-335 be determined based on at least one of the following: CWE, framework alignment, code detail, name, category, and severity of a finding, among other possibilities. In one example, each fingerprint may include at least one of the following: name, category, and severity of a finding. However, the exact combination of fields and their names may be vendor specific. For example, Fortify™ may return a meaningful name as well as category in its results, whereas Checkmarx™ may only return a meaningful name. The code detail may include line number and code content.

To determine if there is any match or partial match among findings, the deduplication system 110 may compare the fingerprints 330-335. The deduplication system 110 may store distinct findings in the non-transitory computer readable medium 220, such as in the form of a table 340. For any new finding received by the deduplication system 110, after normalization, the deduplication system 110 may determine whether the same finding has already existed in the table 340 by comparing the new fingerprint that identifies the new finding with fingerprints that identify existing findings already stored in the table 340.

If the new fingerprint for the new finding fails to at least match any fingerprint for existing findings stored in the table 340, the deduplication system may add the new finding to the table 340. For instance, when the deduplication system 110 first receives findings 1, 2, 3 identifying issues 1, 2, and 3 at the first timestamp from the first tool 120A, the deduplication system 110 may add these findings, such as "FINDING 1", "FINDING 2" and "FINDING 3," associated with the first timestamp such as "TIMESTAMP 1", to the table 340.

If the new fingerprint at least partially matches a fingerprint for an existing finding, the deduplication system 110 may determine if the new finding contains any update with respect to the existing finding. If no update, the deduplication system 110 may discard the new finding.

If there is an update, the deduplication system 110 may update the table 340 to include the update. For instance, after the deduplication system 110 receives findings at the second timestamp from the second tool 120B, the deduplication system 110 may determine fingerprints identifying these findings after normalization. The deduplication system 110 may determine that fingerprint 333 that identifies a finding at least partially matches the fingerprint 330 which identifies an existing finding, "FINDING 1", as stored in the table 340. In fact, both findings refer to the same issue in application code of the software project 310, namely, issue 1. The deduplication system 110 may determine if the finding reported by the second tool 120B contains any update with respect to the existing finding, "FINDING 1", stored in the table 340. Updates may include a line number change, or line content change, among other possibilities. Any update may be stored in the table 340, such as "FINDING 1 UPDATE," associated with the second timestamp, such as "TIMESTAMP 2." For instance, "FINDING 1" may indicate a software issue on line 15, and "FINDING 1 UPDATE" may indicate the same software issue is now moved to line 16.

Similarly, the deduplication system 110 may determine that fingerprint 334 at least partially matches the fingerprint 331 which identifies an existing finding, "FINDING 2", as stored in the table 340. Both refer to the same issue in application code of the software project 310, namely, issue 2. The deduplication system 110 may determine if the finding reported by the second tool 120B contains any update with respect to the existing finding, "FINDING 2", stored in the table 340. Any update may be stored in the table 340, such as "FINDING 2 UPDATE," associated with the second timestamp "TIMESTAMP 2."

With respect to fingerprint 335 identifying finding 4, the deduplication system 110 may determine that fingerprint 335 fails to at least partially match any fingerprint for existing findings stored in the table 340, the deduplication system 110 may add the new finding for storage in the table 340 as "FINDING 4", associated with the second timestamp "TIMESTAMP 2". For instance, "FINDING 4" may indicate a new software issue on line 20.

Figure 4:
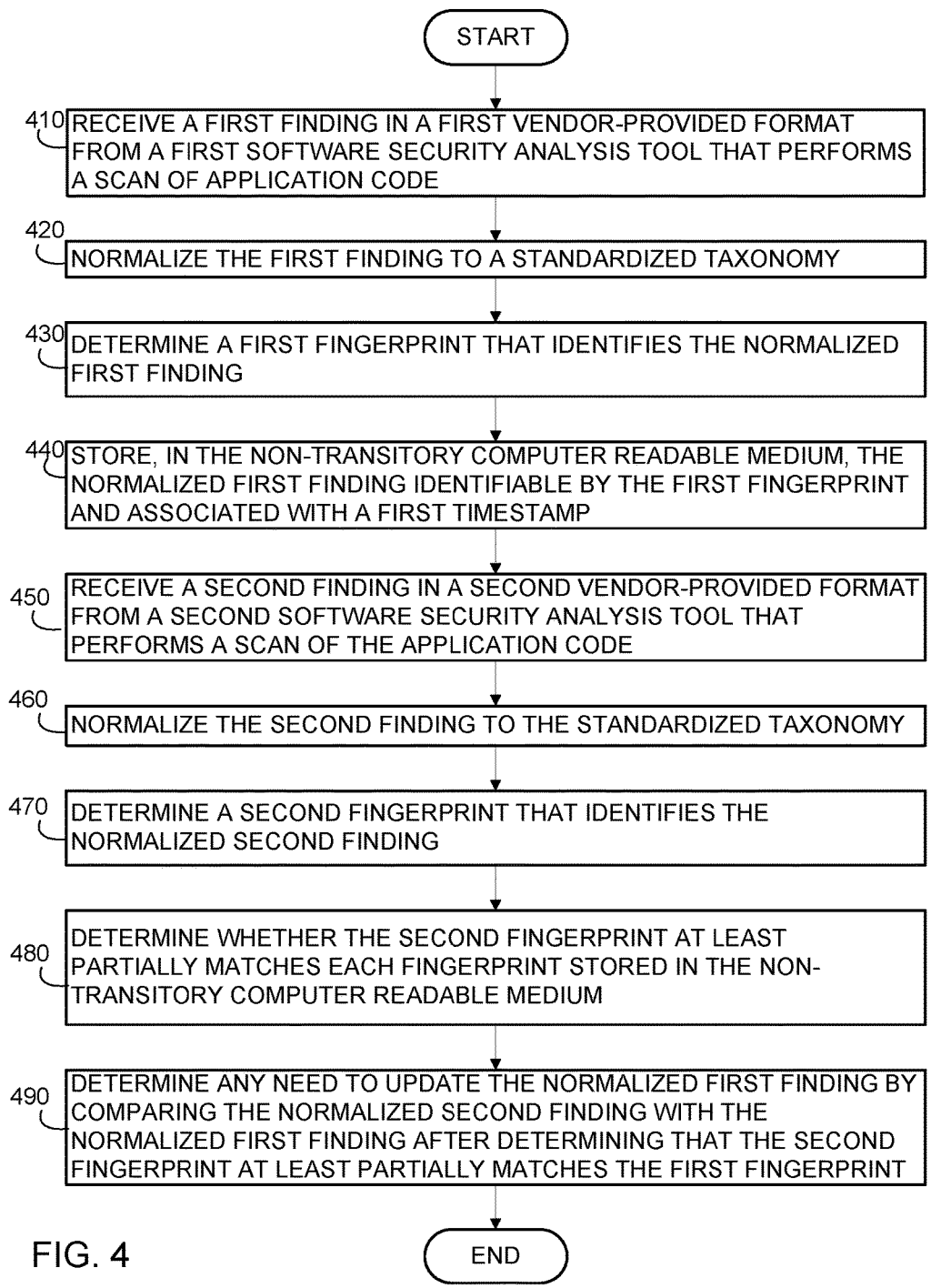
FIG. 4 is an example flow chart of a process performed by the deduplication system according to one aspect of the disclosed technology.

FIG. 4 illustrates an example flow chart of a de-duplication process performed by the deduplication system 110. At 410, the processor 210 may receive a first finding in a first vendor-provided format from the first software security analysis tool 120A. The first software security analysis tool 120A performs a scan of application code of the software project 310. The processor 210 may receive the first finding from the first software security analysis tool 120A at a first timestamp. At 420, the processor 210 may normalize the first finding to a standardized taxonomy. At 430, the processor 210 may determine a first fingerprint that identifies the normalized first finding. At 440, the processor 210 may add the normalized first finding for storage the non-transitory computer readable medium 220. The normalized first finding may be identifiable by the first fingerprint, and may be associated with the first timestamp.

At 450, the processor 210 may receive a second finding in a second vendor-provided format from the second software security analysis tool 120B. The second software security analysis tool 120 may also perform a scan of application code of the software project 310. The processor 210 may receive the second finding from the second software security analysis tool 120A at a second timestamp. At 460, the processor 210 may normalize the second finding to the standardized taxonomy. At 470, the processor 210 may determine a second fingerprint that identifies the normalized second finding. At 480, the processor 210 may determine whether the second fingerprint at least partially matches each fingerprint stored in the non-transitory computer readable medium 220. At 490, the processor 210 may determine that the second fingerprint at least partially matches the first fingerprint. Thereafter, the processor 210 may determine any need to update the normalized first finding by comparing the normalized second finding with the normalized first finding.

In one embodiment, the processor 210 may determine that the second fingerprint at least partially matches the first fingerprint. The processor 210 may store an update to the normalized first finding in the non-transitory computer readable medium 220 after determining that the normalized second finding differs from the normalized first finding. The update to the normalized first finding may be associated with a second timestamp. The graphical user interface 262 may be configured to display the normalized first finding and the first timestamp. The graphical user interface 262 may also be configured to display the update to the normalized first finding and the second timestamp.

In another embodiment, the processor 210 may determine that the second fingerprint fails to at least partially match each fingerprint stored in the non-transitory computer readable medium 220. The processor 210 may add the normalized second finding for storage in the non-transitory computer readable medium 220. The normalized second finding may be identifiable by the second fingerprint.

Figure 5:
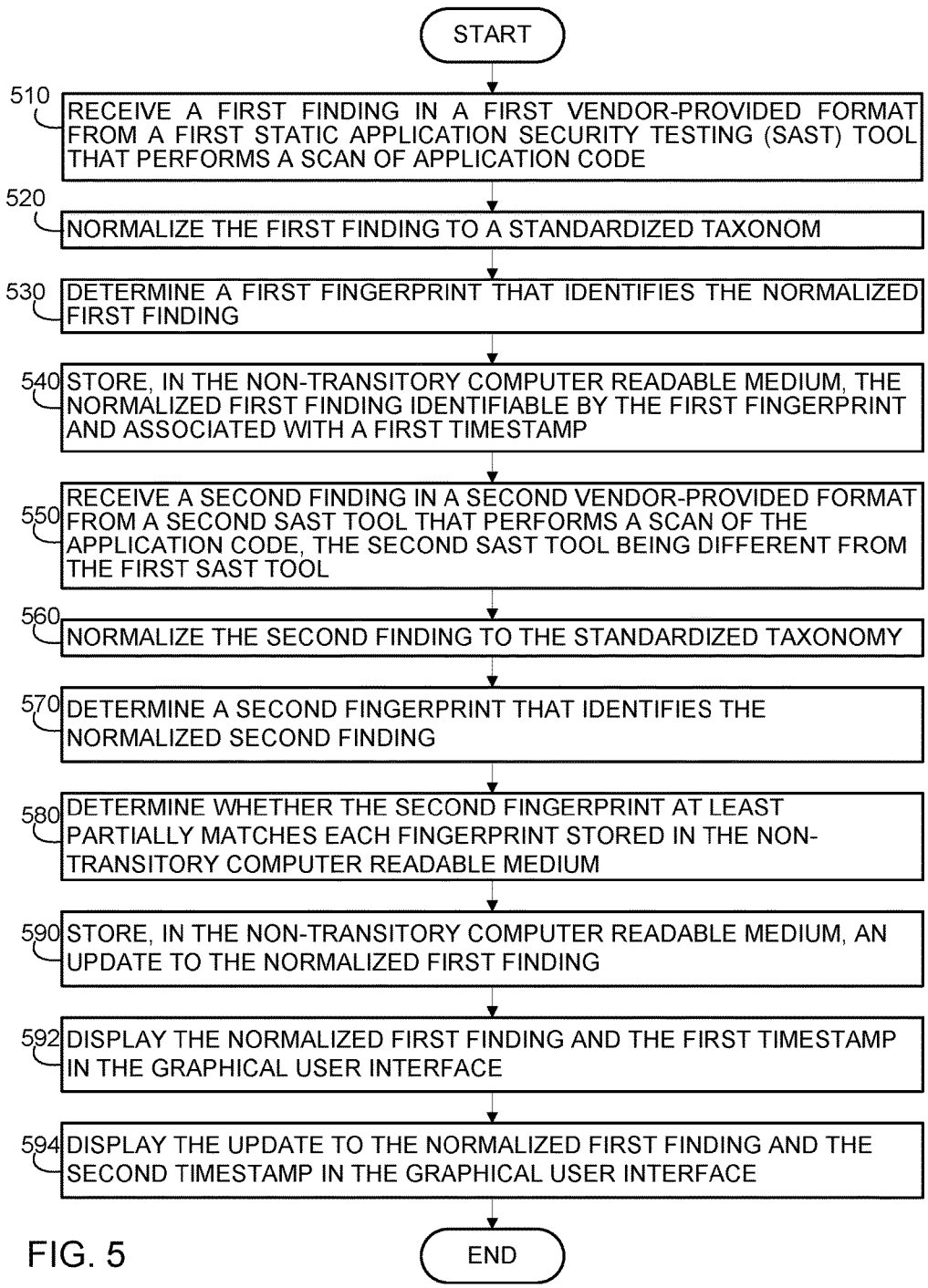
FIG. 5 is an example flow chart of another process performed by the deduplication system according to one aspect of the disclosed technology.

FIG. 5 illustrates another example flow chart of a deduplication process performed by the deduplication system 110. At 510, the processor 210 may receive the first finding in the first vendor-provided format from a first SAST tool at a first timestamp. The first SAST tool performs a scan of application code. At 520, the processor 210 may normalize the first finding to a standardized taxonomy. At 530, the processor 210 may determine a first fingerprint that identifies the normalized first finding;

At 540, the processor 210 may add the normalized first finding for storage in the non-transitory computer readable medium 220. The normalized first finding may be identifiable by the first fingerprint. The normalized first finding may be associated with the first timestamp.

At 550, the processor 210 may receive the second finding in a second vendor-provided format from a second SAST tool at a second timestamp. The second SAST tool may perform a scan of the application code. The second SAST tool may be different from the first SAST tool. For instance, the first SAST tool may be Checkmarx™, while the second SAST tool may be Fortify™. The second vendor-provided format may be different from the first vendor-provided format.

At 560, the processor 210 may normalize the second finding to the standardized taxonomy. At 570, the processor 210 may determine a second fingerprint that identifies the normalized second finding. At 580, the processor 210 may determine whether the second fingerprint at least partially matches each fingerprint stored in the non-transitory computer readable medium 220. At 590, the processor 210 may determine that the second fingerprint at least partially matches the first fingerprint. The processor 210 may also determine that the normalized second finding differs from the normalized first finding. Thereafter, the processor 210 may store an update to the normalized first finding in the non-transitory computer readable medium. The update to the normalized first finding may be based on the normalized second finding. The update to the normalized first finding may be associated with the second timestamp. At 592, the graphical user interface 262 may display the normalized first finding and the first timestamp. At 594, the graphical user interface 262 may also display the update to the normalized first finding and the second timestamp.

Figure 6:
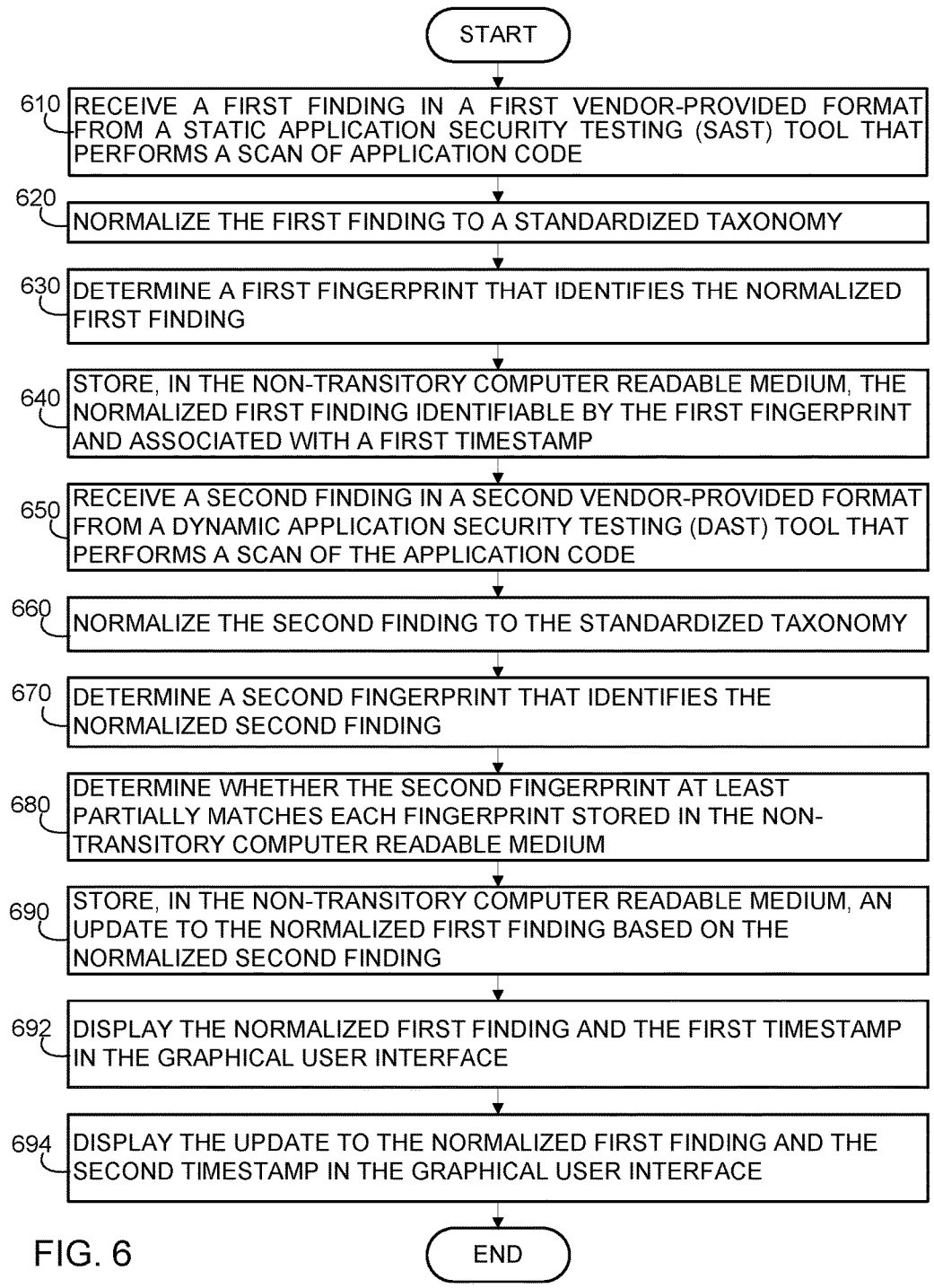
FIG. 6 is an example flow chart of, yet another process performed by the deduplication system according to one aspect of the disclosed technology.

FIG. 6 illustrates another example flow chart of a deduplication process performed by the deduplication system 110. At 610, the processor 210 may receive a first finding in a first vendor-provided format from a SAST tool at a first timestamp. The SAST tool may perform a scan of application code. At 620, the processor 210 may normalize the first finding to a standardized taxonomy. At 630, the processor 210 may determine a first fingerprint that identifies the normalized first finding. At 640, the processor 210 may add the normalized first finding for storage in the non-transitory computer readable medium 220. The normalized first finding may be identifiable by the first fingerprint. The normalized first finding may be associated with the first timestamp.

At 650, the processor 210 may receive a second finding in a second vendor-provided format from a DAST tool at a second timestamp. The DAST tool may perform a scan of the application code. At 660, the processor 210 may normalize the second finding to the standardized taxonomy. At 670, the processor 210 may determine a second fingerprint that identifies the normalized second finding. At 680, the processor 210 may determine whether the second fingerprint at least partially matches each fingerprint stored in the non-transitory computer readable medium 220.

At 690, the processor 210 may determine that the second fingerprint at least partially matches the first fingerprint. The processor 210 may also determine that the normalized second finding differs from the normalized first finding. Afterwards, the processor 210 may store, in the non-transitory computer readable medium, an update to the normalized first finding based on the normalized second finding. The update to the normalized first finding may be associated with the second timestamp.

At 692, the graphical user interface 262 may be configured to display the normalized first finding and the first timestamp.

At 694, the graphical user interface 262 may also be configured to display the update to the normalized first finding and the second timestamp.

In one example, the deduplication system 110 may orchestrate the software security analysis tools 120. The deduplication system 110 may interface with and collect information from various software security analysis tools 120 behind scenes. Acting as an abstraction layer on top of underlying interfaces for software security analysis tools 120, the deduplication system 110 may orchestrate the software security analysis tools 120 by activating their scan functions to scan application code of software projects, monitoring or tracking their scan activities throughout scan processes, and reviewing findings once scans are completed. The deduplication system 110 may serve as a single interface or a single end-point between the user and software security analysis tools 120. By serving as a single interface to access scan results of software security analysis tool 120, the deduplication system 110 may reduce complexity of integration and provide consistency when the user reviews scan results.

The deduplication system 110 may trigger multiple software security analysis tools 120 of the same category to start scan simultaneously or at predetermined timestamps. For example, the deduplication system 110 may instruct multiple SAST tools 130A-C to perform scan simultaneously or at predetermined timestamps. SAST tool 130A may be Checkmarx™, and SAST tool 130B may be Fortify™.

Also, the deduplication system 110 may trigger one or more software security analysis tools 120 of different categories to start scan simultaneously or at predetermined timestamps. For example, the deduplication system 110 may instruct multiple SAST tools 130A-B, and multiple OSA tools 140A-B to perform scan simultaneously or at predetermined timestamps. SAST tool 130A may be Checkmarx™, and SAST tool 130B may be Fortify™. OSA tool 140A may be WhiteSource™, and OSA tool 150B may be Blackduck™.

The deduplication system 110 may trigger the same software security analysis tool 120, such as SAST tool 130A, to perform scan over scan at different timestamps or different scan sessions. SAST tool 130A may be Checkmarx™.

In one scenario, SAST tool 130A reports a finding that identifies a software issue that may need to be resolved to the deduplication system 110. To validate whether the issue has been resolved, the deduplication system 110 may not need to request the same SAST tool 130A to perform scan for a second time. Instead, the deduplication system 110 may wait for remaining tools to complete their scans. Based on findings reported by the remaining tools, the deduplication system 110 may determine that the software issue has been resolved, the deduplication system 110 may update the aggregate scan result.

In one example, as shown in FIG. 2, the deduplication system 110 may be plugged into one or more CI/CD tools 170 such that whenever code is checked in or a change is made to a particular software product, the deduplication system 110 may automatically initiate one or more SAST tools 130A-C, one or more OSA tools 140A-C, one or more DAST tools 150A-C, or one or more IAST tools 160A-C to perform scan. Other software security analysis tools or tool categories may also be implemented. Examples of the CI/CD tools 170 may include Jenkins™ and CircleCI™, among other possibilities.

In one example, the user may operate the deduplication system 110 through one or more external collectors 180. The external collectors 180 may communicate with the API 270 of the deduplication system 110. An example of the external collectors 180 may include Hygieia™, an open source DevOps dashboard for visualizing a development pipeline.

In one example, the deduplication system 110 may rely on the graphical user interface 262 to interact with a user, such as receiving user inquiries, and providing information related to the software security analysis tools 120 and findings to the user.

In one example, when the deduplication system 110 receives a scan request, for example, through the API 270, the deduplication system 110 may automatically trigger one or more software security analysis tools 120 of the same or different categories to start scan. The request may include a minimum level of information needed to selectively activate scan functions on the software security analysis tools 120. In some embodiments, the minimum level of information may be determined based on the selection of security analysis tools 120 accessible to the risk assessment system 110, as well as other product or enterprise considerations. The minimum level of information required of a scan request may thus be abstracted from various requirements and parameters of the various security analysis tools, so as to provide an efficient interface for user interaction.

In one example, the scan request received by the deduplication system 110 may include identification of code of a software project. The identification of code may include a directory indicating where the code is stored. Alternatively, the identification of code may include a zip code file. The scan request may identify the language in which the code is written, such as the primary language that the code is written in. The request may also include an identifier for which component within the system it belongs to. After receiving the scan request, the deduplication system 110 may send instructions to interfaces, such as APIs or command line utilities, of the various software security analysis tools 120. The various software security analysis tools 120 may be selectively determined based on the request and/or the code. Some software security analysis tools 120 may require extra information beyond the scope of the scan request to start execution, such as a line count and secondary language of the code. Although such extra information is not present (or requested of a user) in the scan request received by the deduplication system 110, the deduplication system 110 may independently determine and provide such extra information to the software security analysis tools 120, without user intervention.

Traditionally, when an organization wants to transition from one security tool to another, or swaps out one or more security tools, the organization may need to retool. Such efforts are saved by the deduplication system 110. With the deduplication system 110, backend tools may be added to or removed from the deduplication system 110 in a process transparent to the user or internal customer of the organization.

Each tool 120 may have a different interface or protocol. For example, SAST tools 130A-C, OSA tools 140A-C, DAST tools 150A-C, and IAST tools 160A-C may have interfaces 232A-C, 242A-C, 252A-C and 262A-C, respectively. These tools may have different types of interfaces, including RESTful API, SOAP API, and a command line utility among other possibilities. Traditionally, the user needs to learn protocols of each tool. For instance, in a situation where a first tool has a RESTful API, a second tool has a SOAP API, and a third tool does not have an API but has a command line utility, the user needs to learn how to construct appropriate requests or parameters to execute each tool. With the deduplication system 110 of the example embodiments, the user is no longer involved with constructing requests or parameters required by the individual protocols of each tool. By dealing with the deduplication system 110 alone, the user does not need to learn protocols of each software security analysis tool 120 and does not need to deal with separate interfaces such as APIs or command lines.

The deduplication system 110 may initiate scan activities on multiple software security analysis tools 120, and monitor scan activities performed by each tool from start to completion. As each software security analysis tool 120 completes its scan activity, the deduplication system 110 may receive its findings, store the received findings in the non-transitory computer readable medium 220, and wait for remaining software security analysis tools 120 to complete scans. The non-transitory computer readable medium 220 may store historical information associated with scan activity performed by each software security analysis tool 120, including but not limited to historical developments of findings.

In one example, the deduplication system 110 may compute one or more confidence scores for findings produced by the software security analysis tools 120. The confidence scores may indicate accuracy of the findings. More tools 120 yield the same finding, the more accurate the finding, and the higher the confidence score. For instance, if only two out of three tools 120 generate the same finding, then the finding may have a lesser confidence score compared to a finding reported by all three tools 120.

In another example, the deduplication system 110 may receive findings from three SAST tools 130, where the first two tools generate the same finding, and the third tool does not. The deduplication system 110 may determine a quality of the findings based on what tools found the issue. The deduplication system 110 may compare each confidence score to a predetermined threshold. When the computed confidence score is lower than the predetermined threshold, such as 80%, the finding may be deemed non-real. When the computed confidence score meets the predetermined threshold, the finding may be deemed real. In one example, the graphical user interface 262 of the deduplication system 110 may only show findings that are deemed real.

The deduplication system 110 may orchestrate multiple findings, combine those findings in a way and generate confidence scores that allow the user to decide whether that result is a true positive, false positive, or what other combinations of those. By doing so, the deduplication system 110 may provide a more accurate and complete scan result than what an individual tool would produce. A user may disposition a finding returned by a software security analysis tool 120 as "false positive". In one example, the deduplication system 110 may identify a "false positive" scan result. The deduplication system 110 may subsequently instruct at least one software security analysis tool 120 to perform additional scans to validate the "false positive" scan result.

Each deduplication system 110 may include one or more physical or logical devices (e.g., servers). For example, the deduplication system 110 may be a single device or server or may be configured as a distributed computer system including multiple servers, devices, or computers that interoperate to perform one or more of the processes and functionalities associated with the disclosed embodiments. In some embodiments, the deduplication system 110 may further include a peripheral interface, a transceiver, a mobile network interface in communication with the processor 210, a bus configured to facilitate communication between the various components of the deduplication system 110, and a power source configured to power one or more components of the deduplication system 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, and ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 220 may contain an operating system ("OS") 222 and a program 224. The non-transitory computer readable medium 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 220. The non-transitory computer readable medium 220 may include one or more memory devices that store data and instructions used to perform one or more features of the disclosed embodiments. The non-transitory computer readable medium 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 220 may include software components that, when executed by the processor 210, perform one or more processes consistent with the disclosed embodiments. In some embodiments, the non-transitory computer readable medium 220 may include a database 224 to perform one or more of the processes and functionalities associated with the disclosed embodiments. The non-transitory computer readable medium 220 may include one or more programs 226 to perform one or more functions of the disclosed embodiments. Moreover, the processor 210 may execute one or more programs 226 located remotely from the deduplication system 110. For example, the deduplication system 110 may access one or more remote programs 226, that, when executed, perform functions related to disclosed embodiments.

The deduplication system 110 may also include one or more I/O devices 260 that may comprise one or more interfaces for receiving signals or input from devices and providing signals or output to one or more devices that allow data to be received and/or transmitted by the deduplication system 110. For example, the deduplication system 110 may include interface components, which may provide interfaces to one or more input devices, such as one or more keyboards, mouse devices, touch screens, track pads, trackballs, scroll wheels, digital cameras, microphones, sensors, and the like, that enable the deduplication system 110 to receive data from one or more users. The deduplication system 110 may include a display, a screen, a touchpad, or the like for displaying images, videos, data, or other information. The I/O devices 260 may include the graphical user interface 262.

In exemplary embodiments of the disclosed technology, the deduplication system 110 may include any number of hardware and/or software applications that are executed to facilitate any of the operations. The one or more I/O interfaces 260 may be utilized to receive or collect data and/or user instructions from a wide variety of input devices. Received data may be processed by one or more computer processors as desired in various implementations of the disclosed technology and/or stored in one or more memory devices.

Turning back to FIG. 1, the networks 180 may include a network of interconnected computing devices more commonly referred to as the internet. The network 180 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 180 may comprise any type of computer networking arrangement used to exchange data. For example, the network 180 may be the Internet, a private data network, virtual private network using a public network, and/or other suitable connection(s) that enables components in system environment 100 to send and receive information between the components of system 100. The network 180 may also include a public switched telephone network ("PSTN") and/or a wireless network. The network 180 may also include local network that comprises any type of computer networking arrangement used to exchange data in a localized area, such as WiFi, Bluetooth™ Ethernet, and other suitable network connections that enable components of system environment 100 to interact with one another.

According to some embodiments, the host server 190 may host websites, web portal or software application, data or software applications that may access and interact with the deduplication system 110. A website may be an internal page/site associated with an enterprise, or a publicly accessible website.

Exemplary Use Cases

The following example use case describes examples of implementations of the deduplication system 110. This is intended solely for explanatory purposes and not limitation.

FIG. 7 illustrates a screenshot 700 for operating the deduplication system 110 to perform SAST scans and OSA scans of application code. As shown in FIG. 7, by sending a request to the pictured "/assessment/static" endpoint, back-end scans may be orchestrated for all (or a subset of) enabled SAST tools 130 such as Fortify on Demand™ and Checkmarx™, and all enabled OSA tools 150 such as Whitesource™. The simplified interface shown in the screenshot 700 has two required inputs and two optional inputs (the remaining parameters and configurations etc. being handled automatically by the risk assessment system 110), significantly lower than most individual tool integrations. The deduplication system 110 handles the rest of the required integration with various tools 120 behind the scenes, the required and optional inputs having been abstracted out for ease of use of the user.

Figure 8:
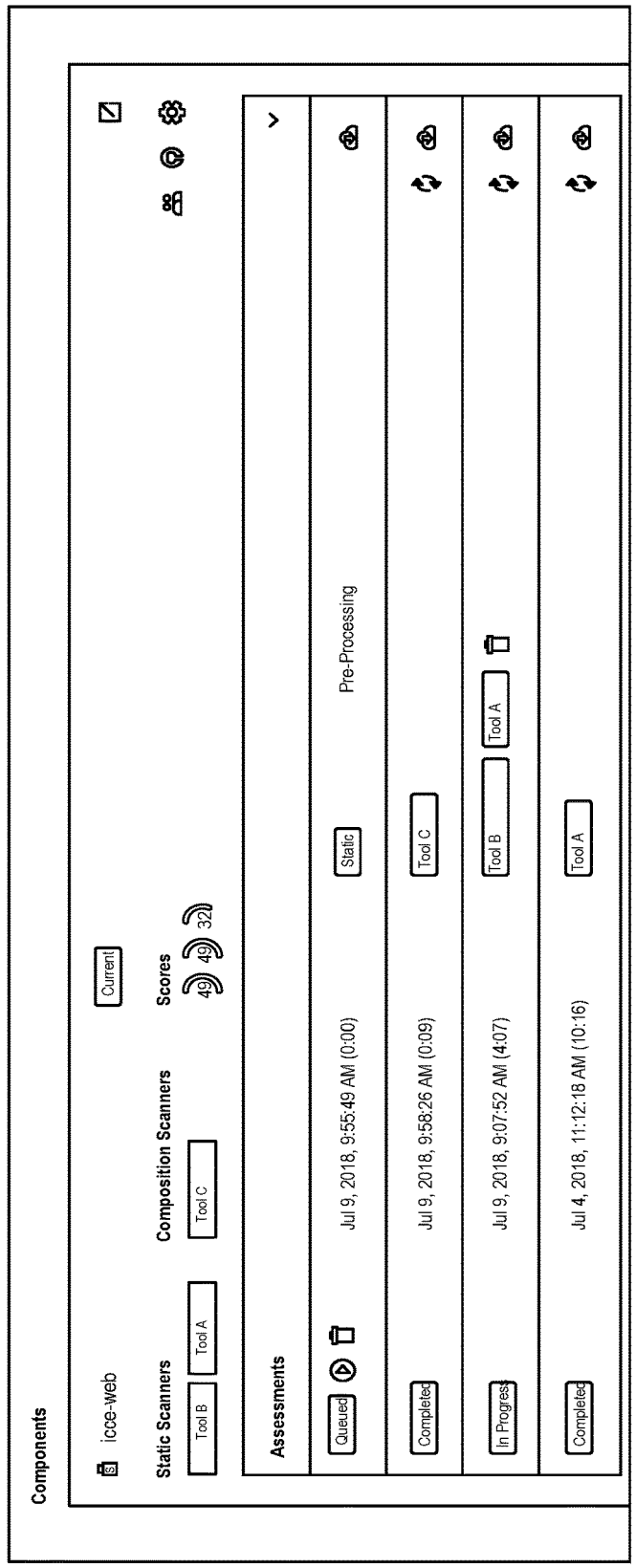
FIG. 8 is another example screenshot of the graphical user interface of the deduplication system according to one aspect of the disclosed technology.

FIG. 8 illustrates a screenshot 800 of the graphical user interface 262 of the deduplication system 110, according to an example implementation. FIG. 8 illustrates a few elements of the orchestration process. The screenshot 800 depicts a view in the deduplication system 110 for a given application or component showing its scan history. As shown, events may be shown sorted in an order from newest to oldest. The oldest event shows a "Completed" assessment where a single scan performed by tool A was run. Thereafter, the screenshot 700 also shows another assessment where two scans performed by tool A and tool B are in progress. In parallel to those scans, another assessment shows a scan performed by tool C with a "Completed" status. For example, tool A may be Checkmarx™, tool B may be Fortify on Demand™, and tool C may be WhiteSource™. Lastly, an additional request, listed as "Queued," is on hold until the scans that are currently in progress have completed.

The deduplication system 110 monitors scan statuses of all tools 120 from start to completion. Once all scans of an assessment have completed, the assessment is marked as "Completed." Upon assessment completion, individual scan results of each tool 120 may be combined into a unified finding view and presented by the deduplication system 110.

The screenshot 800 also shows the ability for admins to configure specific scanners. This may be automatically done as components are enrolled, but can be overridden by admins. As shown in FIG. 8, next to that configuration, scores are shown. This set of three scores are outcomes of most scan recent results. The first score represents a combined static analysis result. The second score represents a combined open source license analysis. The third score represents open source known vulnerabilities.

Figure 9:
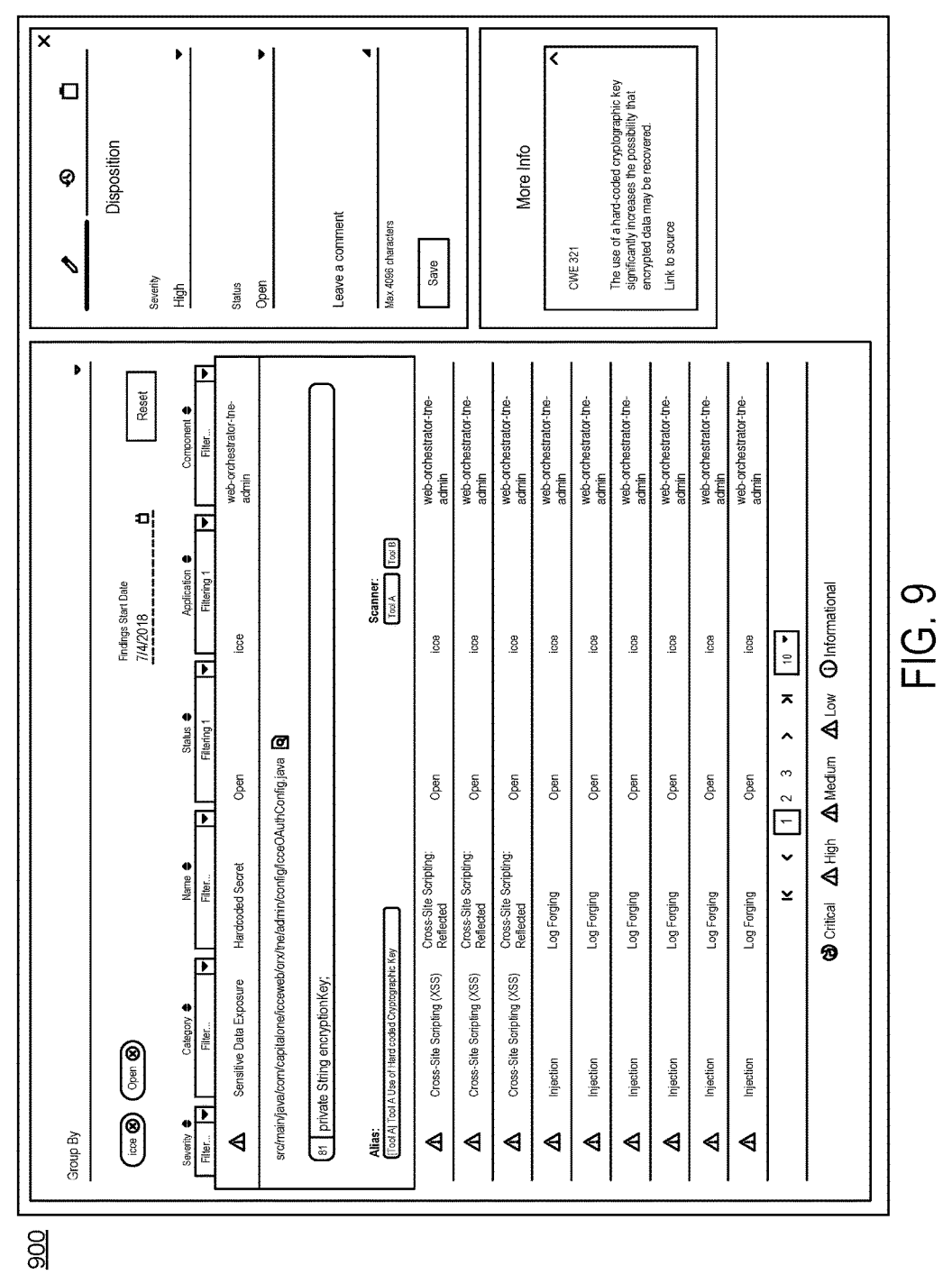

FIG. 9 illustrates a screenshot 900 of the example graphical user interface 262 of the deduplication system 110, according to an example implementation. The screenshot 900 shows findings after each scan has finished. These findings are an aggregate scan result of multiple software security analysis tools 120. As shown in the screenshot 800, the first finding (e.g., a sensitive data exposure—hardcoded secret) was found by both two software security analysis tools: tool A and tool B. For examples, tool A may refer to Checkmarx™, and tool B may refer to Fortify on Demand™ (FOD). The shown results are filterable based on a category and name assigned to each result or finding. In some embodiments, the category and name may be based on a common internal taxonomy that may not directly correspond to a finding output by any one or more tools. After each tool yield its finding, the deduplication system 110 may through its de-duplication process determine that findings provided by each tool in fact refer to the same issue. Instead of creating separate records for the same issue, the deduplication system 110 may consolidate the findings by different tools as a single finding, as shown in the example of the first finding in FIG. 9.

The deduplication system 110 may unify various common fields, such as severity, category, and name to common internal taxonomy, rather than relying on CWE or some other external way to link them. The screenshot 900 illustrates a disposition side-bar where users may dispose findings, where disposition is handled across tools and across assessments/scans.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for performing de-duplication of findings, comprising:
a non-transitory computer readable medium storing normalized software security analysis findings of application code performed by at least one software security analysis tool, each normalized finding being identifiable by a fingerprint;
a graphical user interface for displaying information related to each normalized finding; and
a processor configured to:
receive a first finding in a first vendor-provided format from a first software security analysis tool that performs a scan of application code;
normalize the first finding to a standardized taxonomy;
determine a first fingerprint that identifies the normalized first finding;
store, in the non-transitory computer readable medium, the normalized first finding identifiable by the first fingerprint and associated with a first timestamp;
receive a second finding in a second vendor-provided format from a second software security analysis tool that performs a scan of the application code;
normalize the second finding to the standardized taxonomy;
determine a second fingerprint that identifies the normalized second finding;
determine whether the second fingerprint at least partially matches each fingerprint stored in the non-transitory computer readable medium;
determine whether to update the normalized first finding by comparing the normalized second finding with the normalized first finding when the second fingerprint at least partially matches the first fingerprint; and
store, in the non-transitory computer readable medium, the normalized second finding identifiable by the second fingerprint when the second fingerprint fails to at least partially match any fingerprint stored in the non-transitory computer readable medium.

2. The system of claim 1, wherein the first software security analysis tool and the second software security analysis tool belong to at least one of the following categories: a first category for performing Static Application Security Testing (SAST), and a second category for performing Dynamic Application Security Testing (DAST).

3. The system of claim 2, wherein the first software security analysis tool and the second software security analysis tool belong to the same category.

4. The system of claim 2, wherein the first software security analysis tool and the second software security analysis tool belong to different categories.

5. The system of claim 1, wherein each fingerprint includes at least one of the following: name, category, a code detail, and severity of a finding.

6. The system of claim 5, wherein the code detail includes line number and code content.

7. The system of claim 1, wherein the first software security analysis tool and the second software security analysis tool are from different vendors.

8. The system of claim 1, wherein the first software security analysis tool is identical to the second software security analysis tool.

9. The system of claim 1, wherein the first software security analysis tool is different from the second software security analysis tool.

10. The system of claim 1, wherein the first vendor-provided format is identical to the second vendor-provided format.

11. The system of claim 1, wherein the first vendor-provided format is different from the second vendor-provided format.

12. The system of claim 1, wherein the processor is configured to:
  determine that the second fingerprint at least partially matches the first fingerprint;
  store, in the non-transitory computer readable medium, an update to the normalized first finding after determining that the normalized second finding differs from the normalized first finding, the update to the normalized first finding being associated with a second timestamp;
  display the normalized first finding and the first timestamp in the graphical user interface; and
  display the update to the normalized first finding and the second timestamp in the graphical user interface.

13. The system of claim 1, wherein each software security analysis tool is a standalone solution, a network-based client-server solution, a web-based solution, or a cloud-based solution.

14. The system of claim 1, wherein the non-transitory computer readable medium stores information of historical updates of each normalized finding for display in the graphical user interface upon request.

15. A system for performing de-duplication of findings, comprising:
  a non-transitory computer readable medium storing normalized software security analysis findings of application code performed by at least one software security analysis tool, each normalized finding being identifiable by a fingerprint;
  a graphical user interface for displaying information related to each normalized finding; and
  a processor configured to:
    receive a first finding in a first vendor-provided format from a first SAST tool that performs a scan of application code;
    normalize the first finding to a standardized taxonomy;
    determine a first fingerprint that identifies the normalized first finding;
    store, in the non-transitory computer readable medium, the normalized first finding identifiable by the first fingerprint and associated with a first timestamp;
    receive a second finding in a second vendor-provided format from a second SAST tool that performs a scan of the application code, the second SAST tool being different from the first SAST tool;
    normalize the second finding to the standardized taxonomy;
    determine a second fingerprint that identifies the normalized second finding;
    determine whether the second fingerprint at least partially matches each fingerprint stored in the non-transitory computer readable medium;
    store, in the non-transitory computer readable medium, an update to the normalized first finding based on the normalized second finding after determining that the second fingerprint at least partially matches the first fingerprint and after determining that the normalized second finding differs from the normalized first finding, the update to the normalized first finding being associated with a second timestamp;
    display the normalized first finding and the first timestamp in the graphical user interface; and
    display the update to the normalized first finding and the second timestamp in the graphical user interface,
    wherein the first vendor-provided format is different from the second vendor-provided format.

16. The system of claim 15, wherein each fingerprint includes at least one of the following: name, category, and severity of a finding.

17. A system for performing de-duplication of findings, comprising:
  a non-transitory computer readable medium storing normalized software security analysis findings of application code performed by at least one software security analysis tool, each normalized finding being identifiable by a fingerprint;
  a graphical user interface for displaying information related to each normalized finding; and
  a processor configured to:
    receive a first finding in a first vendor-provided format from a SAST tool that performs a scan of application code;
    normalize the first finding to a standardized taxonomy;
    determine a first fingerprint that identifies the normalized first finding;
    store, in the non-transitory computer readable medium, the normalized first finding identifiable by the first fingerprint and associated with a first timestamp;
    receive a second finding in a second vendor-provided format from a DAST tool that performs a scan of the application code;
    normalize the second finding to the standardized taxonomy;
    determine a second fingerprint that identifies the normalized second finding;
    determine whether the second fingerprint at least partially matches each fingerprint stored in the non-transitory computer readable medium;
    store, in the non-transitory computer readable medium, an update to the normalized first finding based on the normalized second finding after determining that the second fingerprint at least partially matches the first fingerprint and after determining that the normalized second finding differs from the normalized first finding, the update to the normalized first finding being associated with a second timestamp;
    display the normalized first finding and the first timestamp in the graphical user interface; and
    display the update to the normalized first finding and the second timestamp in the graphical user interface.

18. The system of claim 17, wherein each fingerprint includes at least one of the following: name, category, and severity of a finding.

* * * * *